United States Patent [19]

Weng et al.

[11] Patent Number: 5,428,630
[45] Date of Patent: Jun. 27, 1995

[54] SYSTEM AND METHOD FOR VERIFYING THE INTEGRITY OF DATA WRITTEN TO A MEMORY

[75] Inventors: Lih-Jyh Weng, Shrewsbury; Bruce A. Leshay, West Boylston; Diana L. Langer, Northboro, all of Mass.

[73] Assignee: Quantum Corp., Milpitas, Calif.

[21] Appl. No.: 86,528

[22] Filed: Jul. 1, 1993

[51] Int. Cl.⁶ .................................... H03M 13/00
[52] U.S. Cl. .................................... 371/40.1; 371/10.1
[58] Field of Search ............................ 371/37.1–40.4, 371/21.1–22.6, 10.1

[56] References Cited

U.S. PATENT DOCUMENTS

| | | | |
|---|---|---|---|
| 4,413,339 | 11/1983 | Riggle | 371/38 |
| 4,503,420 | 3/1985 | Rub | 340/347 |
| 4,730,321 | 3/1988 | Machado | 371/38 |
| 4,800,549 | 1/1989 | Yamagami | 369/56 |
| 4,856,003 | 8/1989 | Weng | 371/37 |
| 4,866,716 | 9/1989 | Weng | 371/37.1 |
| 4,914,535 | 4/1990 | Weng | 360/72.2 |
| 5,107,503 | 4/1992 | Riggle | 371/37.1 |
| 5,172,381 | 12/1992 | Karb et al. | 371/42 |
| 5,237,574 | 8/1993 | Weng | 371/40.1 |
| 5,285,451 | 2/1994 | Henson et al. | 371/40.1 |

Primary Examiner—James P. Trammell
Attorney, Agent, or Firm—David B. Harrison

[57] ABSTRACT

A method and system for verifying the integrity of data written to a mass memory medium. A local memory is directed by local memory control logic to store a data block that is received from a host microprocessor and that is to be written to the mass memory medium. The data block comprises a sequence of data symbols. An ECC encoder encodes the stored data block with error correction data. The error correction data comprises a sequence of error correction symbols that are appended to the data symbols. The data and error correction symbols are stored in the mass memory and immediately retrieved. An ECC decoder receives the retrieved data and error correction symbols from the mass memory and the data and error correction symbols of the encoded data block from the encoder. In response, the decoder generates an error status signal when more than a predetermined threshold number of the retrieved data and error correction symbols are improperly stored in the mass memory. The local memory control logic receives the error status signal and generates in response a second error status signal. The host microprocessor receives the second error status signal and generates in response remedial action signals.

20 Claims, 9 Drawing Sheets

SYSTEM AND METHOD FOR VERIFYING THE INTEGRITY OF DATA WRITTEN TO A MEMORY

The present invention relates generally to mass memory storage systems and methods. Specifically, it relates to systems and methods for verifying the integrity of data written to a mass memory.

BACKGROUND OF THE INVENTION

Data written to a mass memory medium may be improperly stored for several reasons. For example, the memory medium used may have imperfections and may degrade over time. These types of errors are magnified where the mass memory medium is small and the storage densities are large. This is particularly true of memory disks.

In order to cope with these errors, error correcting code (ECC) strategies are used to recover data that may have been corrupted. It is desirable to detect when data written to a memory medium has degraded to the point where the user is in danger of not being able to recover the data. If the degradation is detected in time, the data can be recovered and rewritten to a different part of the memory medium. This is done by immediately reading back a block of data that has just been written to the medium and comparing it with what was intended to be written.

In the past, several methods have been used to accomplish such a task. However, they all suffer from serious drawbacks that render them impractical.

One of these methods initially requires transferring a specified block of data from the host microprocessor to the local random access memory (RAM) of the mass memory system. The data block is then transferred from the RAM to the mass memory medium. It is then immediately read back from the medium and stored in the RAM. Both data blocks are then sent to the microprocessor that performs a comparison of what was read off the disk and what was intended to be written. However, this method is slow and costly since the host microprocessor must perform the data comparison.

It is therefore an object of the present invention to provide a system and method that verifies the integrity of data written to a mass memory medium independently of the host microprocessor.

SUMMARY OF THE INVENTION

In summary, the present invention is a method and system for verifying the integrity of data written to a mass memory by a host processor. The method and system utilize a read/write controller for the mass memory and the mass memory itself. The mass memory includes a mass memory medium and a mass memory control logic. The read/write controller includes a local memory, direct memory access (DMA) control logic for use with the local memory, an ECC encoder, an ECC decoder, and a control circuit for controlling the operations of the ECC encoder and the ECC decoder.

When a data block is to be written to the mass memory medium, the DMA control logic initially stores the data block in the local memory. The data block is stored in the local memory as a sequence of data symbols. The DMA control logic then retrieves the data block which is then provided to the ECC encoder. The ECC encoder encodes the retrieved data block with error correction data. The error correction data comprises a sequence of error correction symbols that are appended to the data symbols. The DMA logic then instructs the mass memory control logic to store the data and error correction symbols in the mass memory.

Immediately after the data and error correction symbols have been stored in the mass memory, they are retrieved by the mass memory control logic. The ECC decoder compares the retrieved data and error correction symbols with the data and error correction symbols of the encoded data block from the encoder. In response, the decoder generates an error status signal when more than a predetermined threshold number of the retrieved data and error correction symbols are improperly stored in the mass memory. The threshold number T is selected to be greater than one and less than the actual number A of improperly stored symbols that the ECC employed can correct.

The DMA control logic receives the error status signal and generates in response a corresponding error status signal. The host processor receives this second error status signal and generates in response remedial action signals. These remedial action control signals can include signals for attempting a second time to store the data block at the same location in the mass memory medium or for storing the data block at a different location.

BRIEF DESCRIPTION OF THE DRAWINGS

Additional objects and features of the invention will be more readily apparent from the following detailed description and appended claims when taken in conjunction with the drawings, in that:

DETAILED DESCRIPTION OF THE INVENTION

Figure 1:
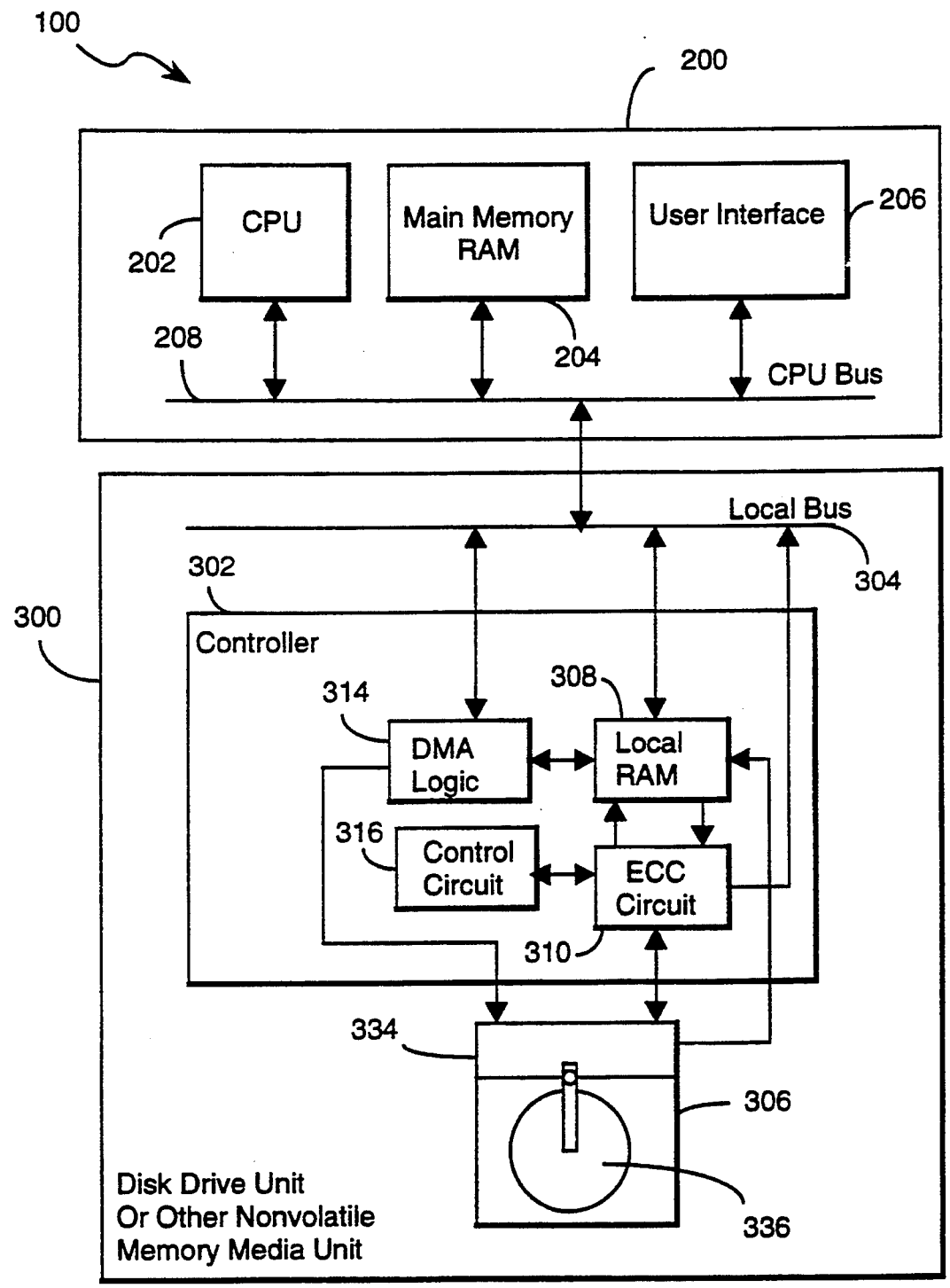
FIG. 1 is a block diagram of a mass memory storage system in accordance with the present invention.

Referring to FIG. 1, there is shown a system 100 for verifying the integrity of data written to a mass memory storage medium. The system 100 includes the host computer system 200 and the mass memory storage system 300.

Figure 2:
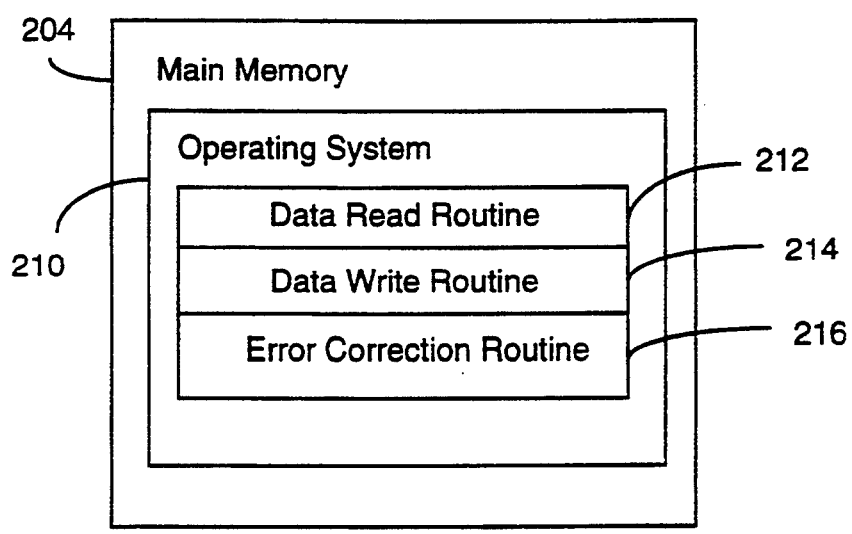
FIG. 2 provides the routines stored in the CPU of a host computer system used for data storage and retrieval.

The host system 200 includes the central processing unit (CPU) 202, the main memory 204, the user interface 206, and the bus 208. The main memory 204 contains the operating system 210 of the host system 200. As shown in FIG. 2, the operating system 210 includes a data read routine 212, a data write routine 214, and an error correcting code (ECC) routine 216.

The mass memory storage system 300 can be a disk drive unit or other non-volatile memory media unit. It includes the read/write controller 302, the local bus 304, and the mass memory 306. The read/write controller 302 includes a local random access memory (RAM) 308, an ECC circuit 310, a direct memory access controller (DMA) 314, and a control circuit 316.

In the preferred embodiment, the ECC circuit utilizes a Reed-Solomon ECC. The issued U.S. Pat. Nos. 4,413,339 and 5,107,503 describe methods for encoding and decoding a data block with a Reed-Solomon ECC. These issued patents are expressly incorporated herein.

As discussed in the identified patents, the original data block that is to be encoded with a Reed-Solomon (N, K) ECC is represented by the data word $d(x)$. The data word $d(x)$ has K symbols. The encoded data block is represented by the code word $c(x)$. The code word $c(x)$ has N symbols.

The data word $d(x)$ represents a polynomial of degree $K-1$ with the K symbols as the coefficients. The ECC is used to encode the original data block by generating error correction data represented by the checksum word $E(x)$ that has N-K symbols. The checksum word $E(x)$ represents a polynomial of degree $N-K-1$ and its N-K symbols are the coefficients. The checksum word $E(x)$ is generated from the following relationship established in Equation )1):

$$E(x) = \text{Remainder of } [d(x) * x^{N-K}/g(x)] \quad (1)$$

where $g(x)$ represents a generator polynomial chosen to generate the N-K error correction symbols. For a Reed-Solomon ECC, the generator polynomial $g(x)$ is represented generally as follows in Equation (2):

$$g(x) = (x + \alpha^{-(N-K-1)/2}) \ldots (x + \alpha^i) \ldots (x + \alpha^{(N-K-1)/2}) \quad (2)$$

where $\alpha^i$ represents the $i^{th}$ root in the Galois Field $GF(2^m)$ and m represents the number of binary bits used to represent each data symbol of the data word $d(x)$ used in generating the m bit error correction symbols of the checksum word $E(x)$. The checksum word $E(x)$ is appended to the data word $d(x)$ so that the code word $c(x)$ is represented as follows in Equation (3):

$$c(x) = d(x) + E(x) \quad (3)$$

where the first K coefficients of the polynomial $c(x)$ are the data symbols of the data word $d(x)$ and the next N-K coefficients are the error correction symbols of the checksum word $E(x)$.

EMBODIMENT UTILIZING ECC DECODER

Figure 3:
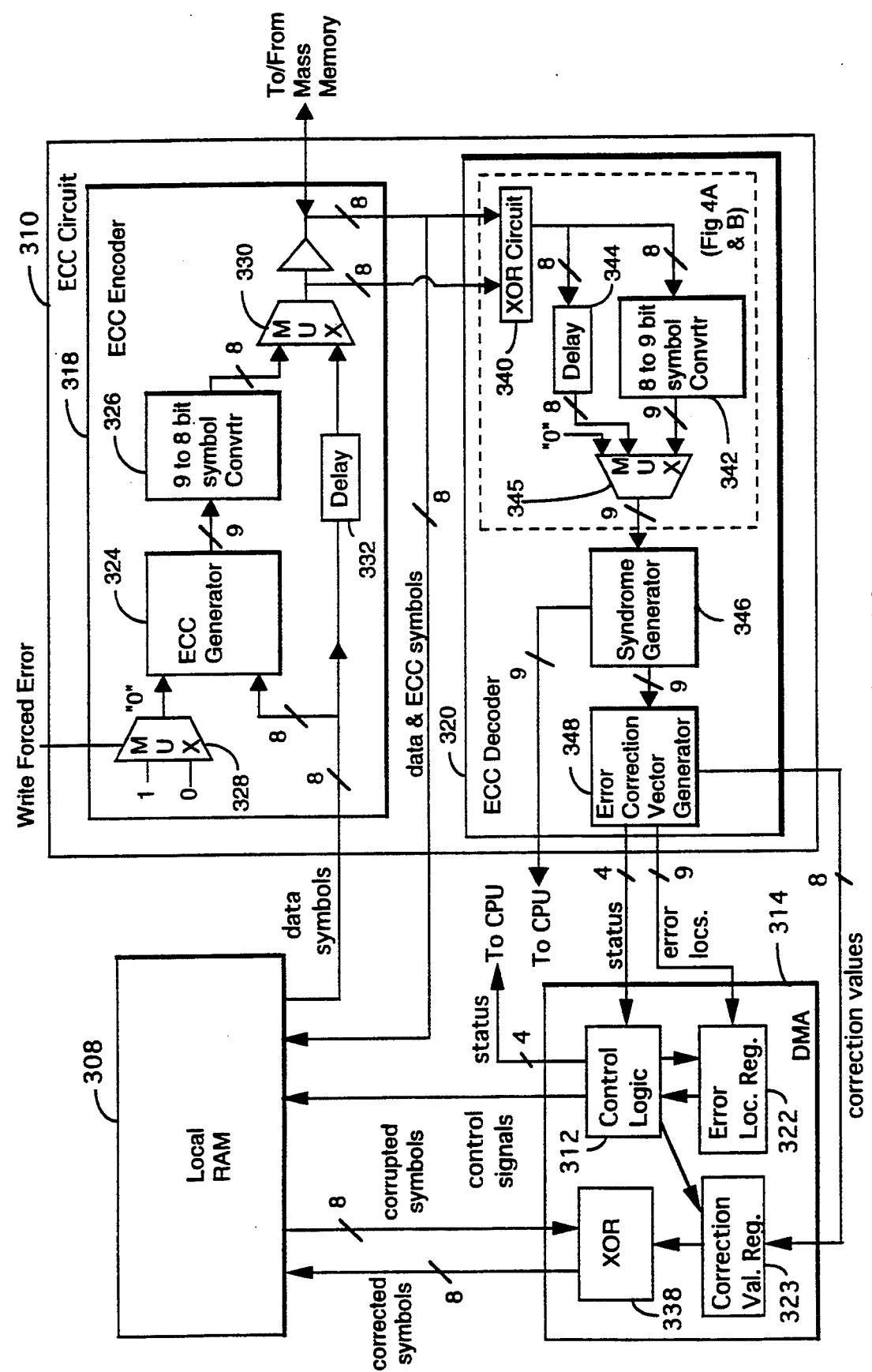
FIG. 3 provides a read/write controller employing an ECC encoder and ECC decoder in accordance with the present invention.
Figure 4A:
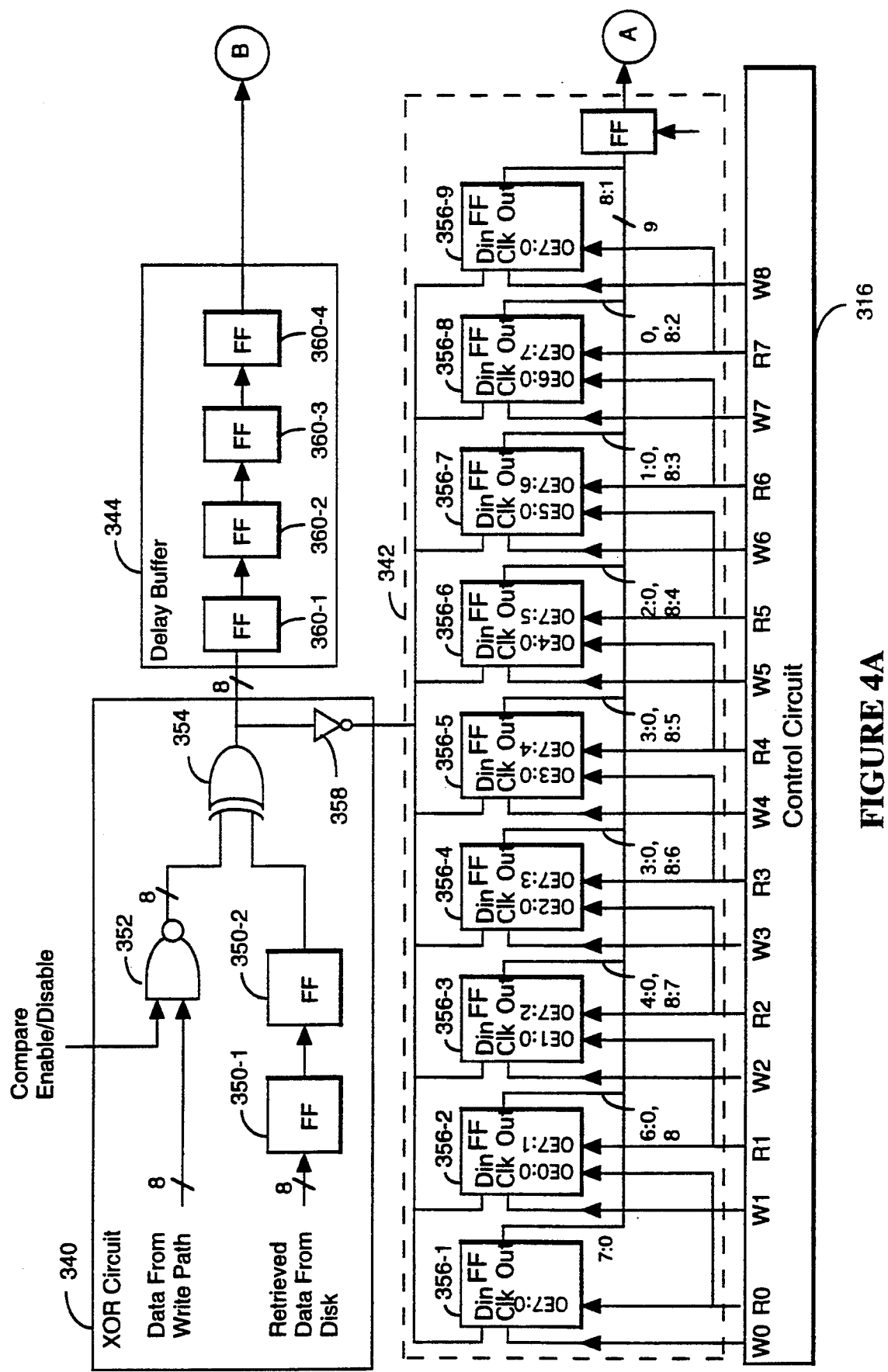
FIG. 4A provides a logic diagram of an XOR circuit, an 8 bit to 9 bit symbol converter, and a delay buffer employed by the ECC decoder.
Figure 4B:
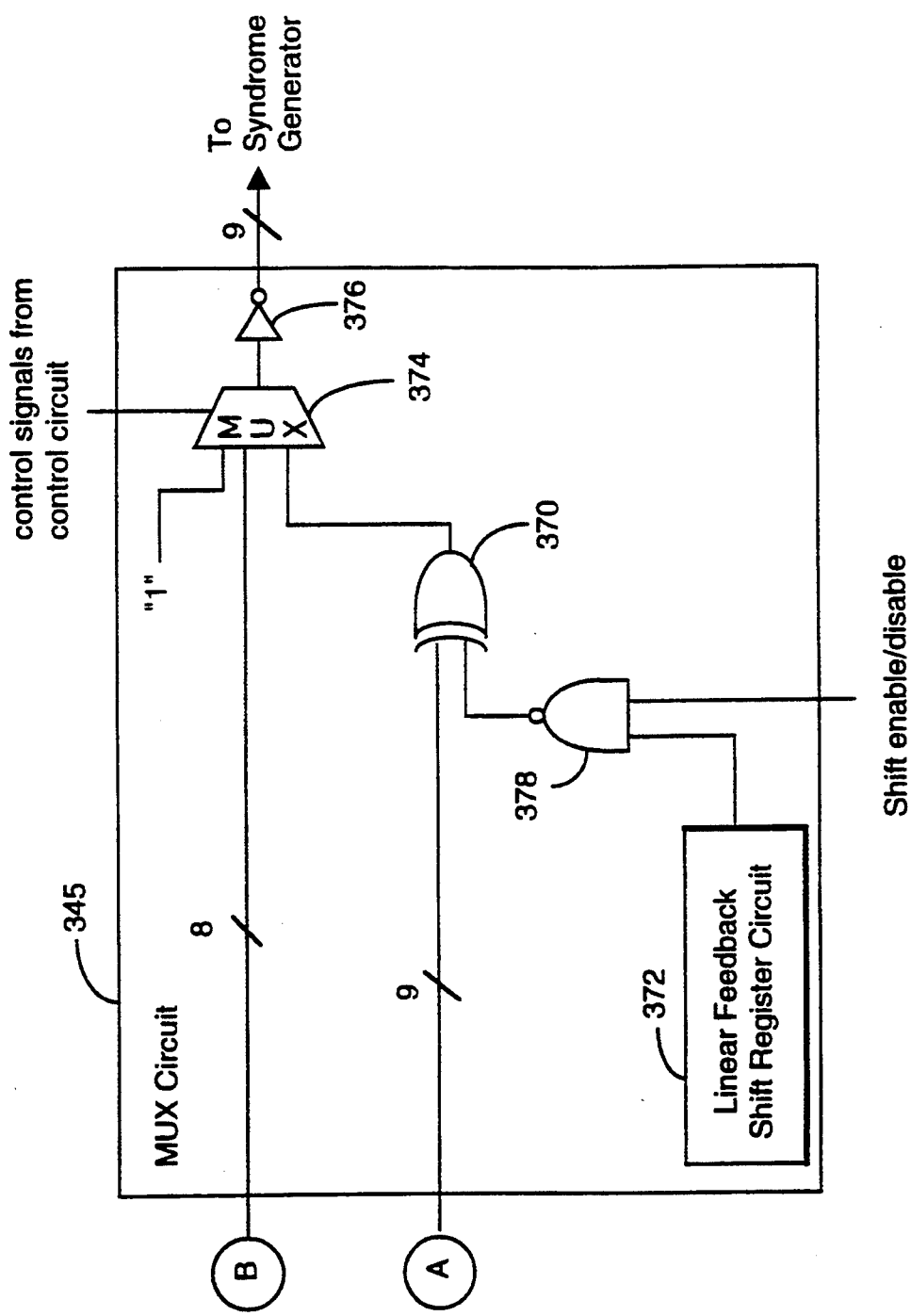
FIG. 4B provides a logic diagram of a multiplexer (MUX) circuit employed by the ECC decoder.
Figure 5:
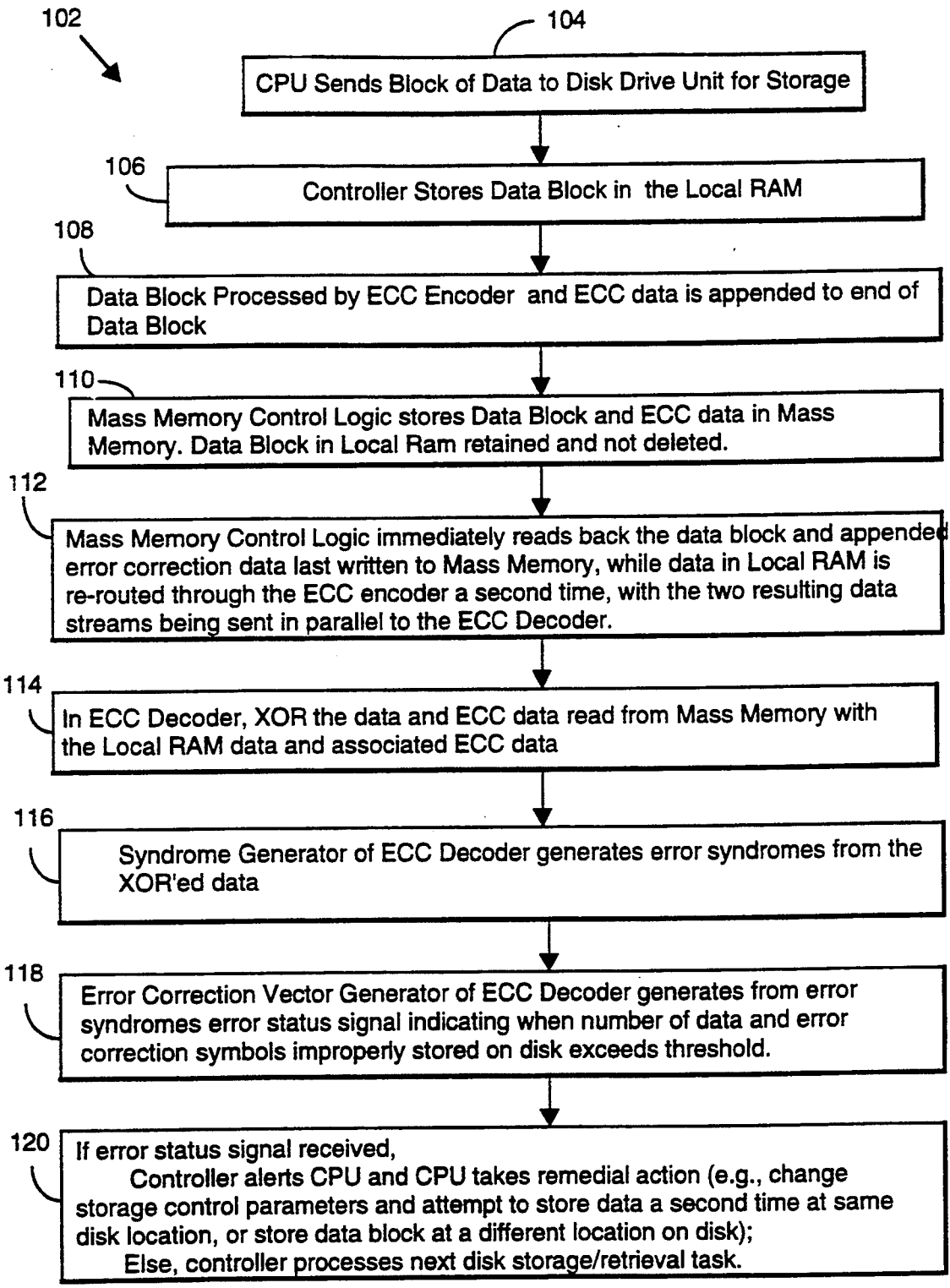
FIG. 5 provides a method associated with the mass memory controller of FIG. 3.

FIGS. 3, 4A, and 4B in conjunction with FIG. 1 provide illustrations of one embodiment of the invention. In this embodiment, the ECC circuit 310 employs an ECC encoder 318 and an ECC decoder 320. FIG. 5 shows the method 102 associated with this embodiment.

Writing Data Block to Mass Memory with Verification

Referring initially to FIG. 1, data is written to the mass memory 306 in response to a user request generated with the user interface 206 or in response to a request generated by an application program being executed by the CPU 202. Referring to FIG. 2, in response to such a request, the CPU 202 calls up the data write routine 214 of the operating system 210. Returning to FIG. 1, the data write routine 214 generates a data write signal and sends a data block to the mass memory storage system 300 for storage. This is shown in FIG. 5 as step 104 of method 102.

The mass memory storage system 300 receives the data write signal and the data block on the local bus 304. In response to the data write signal, the DMA 314 controls storage of the data block in the local RAM 308. Referring to FIG. 3, this step is accomplished by the control logic 312 of the DMA 314. And, this step is shown in FIG. 5 as step 106 of method 102.

Referring back to FIG. 3, in the preferred embodiment, the original data block is stored in the RAM 308 as a sequence of up to 1000 data symbols. Each data symbol is initially represented by an 8 bit data symbol. The sequence of data symbols includes up to 500 odd numbered symbols and 500 even numbered symbols. Thus, the original data block may be represented by the two interleaved data words $d_{odd}(x)$ and $d_{even}(x)$. The data words $d_{odd}(x)$ and $d_{even}(x)$ represent polynomials of order 499 (i.e. 500-1) respectively having the 500 odd numbered symbols and the 500 even numbered symbols as their coefficients.

Immediately after the data block is stored in RAM 308, the control logic 312 of the DMA 314 controls retrieval of the data block so that is provided to the ECC circuit 310. The ECC circuit 310 includes the ECC encoder 318 for encoding the data block with error correction data. The ECC encoder 318 includes a Reed-Solomon ECC generator 324, a 9 bit to 8 bit symbol converter 326, two multiplexers (MUXs) 328 and 330, and a delay buffer 332.

The ECC generator 324 receives the interleaved data words $d_{odd}(x)$ and $d_{even}(x)$ of the data block and encodes it with error correction data by utilizing two Reed-Solomon (523, 512) ECCs that are interleaved. The first of the interleaved Reed-Solomon ECCs is for encoding the 500 even numbered symbols of the original data block and the second of the interleaved Reed-Solomon ECCs is for encoding the 500 odd numbered symbols of the original data block.

The ECC generator 324 generates the checksum words $E_{odd}(x)$ and $E_{even}(x)$ from the data words $d_{odd}(x)$ and $D_{even}(x)$ by utilizing Equations (1) and (2). In this embodiment, N-K=11 (i.e. 511−500), m=9, and the Galois Field GF ($2^9$) is generated from the primitive polynomial $x^9 + x^4 + 1$. Thus, each of the checksum words $E_{odd}(x)$ and $E_{even}(x)$ generated by the ECC generator 318 includes 11 error correction symbols each being represented by a 9 bit error correction symbol. The 11 error correction symbols generated by the ECC associated with the even numbered symbols of the data block will enable correction of up to 5 symbols of the total number of symbols in the words $d_{even}(x)$ and $E_{even}(x)$. Similarly, the 11 error correction symbols generated by the ECC associated with the odd numbered symbols of the data block will enable correction of up to 5 symbols of the total number of symbols in the words $d_{odd}(x)$ and $E_{odd}(x)$. Thus, up to 10 symbols of the stored data block can be corrupted in the mass memory 306 before the data block becomes unrecoverable.

Since m=9, each of the symbols of the data words $d_{odd}(x)$ and $d_{even}(x)$ must be represented by a 9 bit data symbol during the encoding process of the ECC generator 324. Thus, the MUX 328 is used to provide the ECC generator 324 with an extra "0" bit so that each symbol of the data words $d_{odd}(x)$ and $d_{even}(x)$ is now represented by a 9 bit symbol rather than an 8 bit symbol.

The sequence of 9 bit symbols that represent the error correction symbols of the generated checksum words $E_{odd}(x)$ and $E_{even}(x)$ are then sequentially sent to the 9 bit to 8 bit symbol converter 326. The converter 326 outputs the error correction symbols of the checksum words $E_{odd}(x)$ and $E_{even}(x)$ as a sequence of 8 bit symbols. As is the case with the data symbols of the data words $d_{odd}(x)$ and $d_{even}(x)$, the error correction symbols of the checksum words $E_{odd}(x)$ and $E_{even}(x)$ are interleaved.

At the same time that the sequence of 8 bit data symbols representing the data words $d_{odd}(x)$ and $d_{even}(x)$ are received by the ECC generator 324, they are received by the delay buffer 332. The delayed 8 bit data symbols are then sent on to the MUX 330.

The MUX 330 is controlled by the control circuit 316 so as to append the 8 bit symbols containing the error correction symbols of the checksum words $E_{odd}(x)$ and $E_{even}(x)$ to the end of the stream of 8 bit data symbols representing the data words $d_{odd}(x)$ and $d_{even}(x)$. Thus, the MUX 330 generates the interleaved code words $c_{odd}(x)$ and $c_{even}(x)$. The 8 bit data symbols and the appended 8 bit error correction symbols that make up the code words $c_{odd}(x)$ and $c_{even}(x)$ are then sent sequentially to the mass memory 306 for storage therein at a specified address. Furthermore, rather than being deleted, the data block in the local RAM 308 is still retained.

Thus, the step of encoding the data block with error correction data is performed by the ECC encoder 318 by generating the error correction symbols and appending them to the data symbols to form the code words $c_{odd}(x)$ and $c_{even}(x)$. This is shown in FIG. 5 as step 108 of method 102.

The sequence of 8 bit data and error correction symbols representing the code words $c_{odd}(x)$ and $c_{even}(x)$ are received by the mass memory 306 from the MUX 330. As shown in FIG. 1, the mass memory 306 includes mass memory control logic 334 and the mass memory medium 336.

In response to the data write signal generated by the data write routine 214 of the host system 200, the control logic 312 of the DMA 314 generates a data store signal for directing storage of the 8 bit data and error correction symbols. This signal is received by the mass memory control logic 334 which controls storage of the data and error correction symbols in the mass memory medium 336. This is shown in FIG. 5 as step 110 of method 102. Since the data and error correction symbols of the code words $c_{odd}(x)$ and $c_{even}(x)$ may have been corrupted when stored, these symbols now represent the possibly corrupted data words $c'_{odd}(x)$ and $c'_{even}(x)$.

Immediately after the data and error correction symbols are stored in the mass memory medium 336, the control logic 312 of the DMA 314 generates a data retrieve signal for controlling retrieval of the just stored symbols. The mass memory control logic 334 receives this signal and controls retrieval from mass memory medium 336 of the possibly corrupted data and error correction symbols representing the code words $c_{odd}(x)$ and $c'_{even}(x)$. This is shown in FIG. 5 as step 110 of method 102.

At the same time that the 8 bit data and error correction symbols are read back from the mass memory 306, the control logic 312 of the DMA 314 directs the local RAM 308 to send the sequence of 8 bit data symbols representing the data words $d_{odd}(x)$ and $d_{even}(x)$ to the ECC encoder 318 for a second time. As a result, the ECC generator 324 performs the step of encoding the data block with error correction data for a second time. Once again, the MUX 330 appends the 8 bit error correction symbols representing the checksum words $E_{odd}(x)$ and $E_{even}(x)$ to the end of the stream of 8 bit data symbols representing the data words $d_{odd}(x)$ and $d_{even}(x)$. This is shown in FIG. 5 as step 112 of method 102.

The decoder 320 receives simultaneously the sequence of 8 bit symbols representing the code words $c_{even}(x)$ and $c_{odd}(x)$ generated by the encoder 318 during the second encoding and the sequence of 8 bit symbols representing the code words $c'_{odd}(x)$ and $c'_{even}(x)$ retrieved from mass memory 306. The decoder 320 includes an XOR circuit 340, an 8 bit to 9 bit symbol converter 342, a delay buffer 344, a MUX circuit 345, a syndrome generator (SY) 346, and an error correction vector generator (ECVG) 348.

The XOR circuit 340 receives the 8 bit symbols representing the code words $c_{odd}(x)$ or $c_{even}(x)$ provided by the encoder 318 and the corresponding 8 bit symbols of the code words $c'_{odd}(x)$ and $c'_{even}(x)$ retrieved from the mass memory 306. As shown in FIG. 4A, the XOR circuit 340 includes two arrays of flip flops 350-1 and 350-2, an array of NAND gates 352, an array of XOR gates 354, and an array of inverters 358.

The two flip flop arrays 350-1 and 350-2 each comprise 8 parallel flip flops. These flip flop arrays are used to delay the reception of the sequence of inverted symbols representing the code words $c'_{odd}(x)$ and $c'_{even}(x)$ by the array of XOR gates 354.

The array of NAND gates 352 comprises 8 parallel NAND gates. These are used to enable and disable the comparing function of the array of XOR gates 354. During a write operation, as in this case, the control circuit 316 generates a compare enable signal received by the NAND gate array 352. This enable signal results in the symbols of the code words $c_{odd}(x)$ or $c_{even}(x)$ received from the encoder 318 being received by the array of XOR gates 354 in inverted form.

The array of XOR gates 354 comprises 8 parallel XOR gates. These gates perform the earlier described comparing function of the XOR circuit 340 by XOR'ing the bits of each of the inverted 8 bit symbols received from the NAND gate array 352 with the non-inverted bits of the corresponding symbol received from the flip-flop array 350-2. The resulting sequence of 8 bit symbols represents the inverted and interleaved remainder words $R_{odd}(x)$ and $R_{even}(x)$.

The array of inverters 358 comprises 8 parallel inverters. These are used to invert the 8 bit symbols representing the inverted remainder words $R_{odd}(x)$ and $R_{even}(x)$. As a result, the inverted symbols now represent the non-inverted or true remainder words $R_{odd}(x)$ and $R_{even}(x)$. Each non-zero symbol of the remainder word $R_{odd}(x)$ indicates that the corresponding retrieved data or error correction symbol of the code word $c'_{odd}(x)$ was improperly stored in the mass memory 306. Similarly, each non-zero symbol of the remainder word $R_{even}(x)$ indicates that the corresponding retrieved data or error correction symbol of the code word $c'_{even}(x)$ was improperly stored in the mass memory 306.

Thus, the XOR circuit 340, in effect, compares each data and error correction symbol of the code words $c_{odd}(x)$ or $c_{even}(x)$ received from the encoder 318 with the corresponding data and error correction symbol of the code words $c'_{odd}(x)$ and $c'_{even}(x)$ retrieved from the mass memory 306. As indicated previously, the resulting sequence of symbols represent the remainder words $R_{odd}(x)$ and $R_{even}(x)$. This is shown in FIG. 5 as step 114 of method 102.

The 8 bit to 9 bit symbol converter 342 receives the sequence of symbols representing the remainder words $R_{odd}(x)$ and $R_{even}(x)$ and converts them into a sequence of 9 bit symbols. As shown in FIG. 4A, the 8 bit to 9 bit symbol converter 342 includes 9 arrays of D flip flops 356-1 to 356-9. The control circuit 316 controls the converter 342 so that only one 8 bit symbol is written to one of the arrays 356-1 to 356-9 at one time. However, the control circuit 316 also controls the converter 342 so that any two of the arrays 356-1 to 356-9 will together output a 9 bit symbol at one time. The 9 bit to 8 bit symbol converter 326 is configured similarly.

The MUX circuit 345 receives the sequence of 9 bit symbols that make up the remainder words $R_{odd}(x)$ and $R_{even}(x)$. AS shown in FIG. 4B, the MUX circuit 345 includes an array of XOR gates 370, a linear feedback shift register circuit 372, a NAND gate array 378, and a MUX 374.

The array of XOR gates 370 includes 8 parallel XOR gates. This array 370 directly receives the sequence of 9 bit symbols that make up the remainder words $R_{odd}(x)$ and $R_{even}(x)$ and also the output of the NAND gate array 378.

The NAND gate array 378 comprises 8 parallel NAND gates. When the NAND gate array 378 receives a shift enable signal, the linear feedback shift register circuit 372 together with the XOR gate array 370 protects against shifts of the sequence of symbols representing the remainder words $R_{odd}(x)$ and $R_{even}(x)$. However, when the NAND gate array 378 receives a shift disable signal, the XOR gate array 370 simply outputs symbols representing the remainder words $R_{odd}(x)$ and $R_{even}(x)$ in inverted form.

These inverted symbols are then provided to the MUX 374. The MUX 374 is controlled by the control circuit 316 so as to route these symbols to the syndrome generator 346. However, the inverted symbols representing the remainder words $R_{odd}(x)$ and $R_{even}(x)$ are inverted by the array of 8 parallel inverters 376 prior to being received by the syndrome generator 346. Thus, the syndrome generator 346 receives the symbols of the remainder words $R_{odd}(x)$ and $R_{even}(x)$ in non-inverted form.

The syndrome generator 346 computes 11 (i.e. N−K=511−500=11) error syndromes $S_{odd/i}$ for the interleaved ECC associated with the data word $d_{odd}(x)$ and 11 error syndromes $S_{even/i}$ for the interleaved ECC associated with the data word $d_{even}(x)$. This is shown in FIG. 5 as step 116 of method 102. These error syndromes may be generated from the division of each of the remainder words $R_{odd}(x)$ and $R_{even}(x)$ with each of the 11 factors $g_i(x)$ of the generator polynomial $g(x)$. Each of the error syndromes $S_{odd/i}$ and $S_{even/i}$ is represented by 9 bits.

The ECVG 348 receives the error syndromes $S_{odd/i}$ and $S_{even/i}$ from the syndrome generator 346. From the received syndromes $S_{odd/i}$ and $S_{even/i}$, the ECVG 348 is configured to detect for each of the retrieved code words $c'_{odd}(x)$ and $c'_{even}(x)$ how many, up to a predetermined threshold number T, of the data and error correction symbols are improperly stored in the mass memory 306 and also where these improperly stored symbols are located in the sequence of symbols.

The ECVG 348 outputs a status signal for each of the code words $c'_{odd}(x)$ and $c'_{even}(x)$. When the there are no more than T improperly stored symbols for each of the code words $c'_{odd}(x)$ and $c'_{even}(x)$, the ECVG 348 outputs a "good" status signal. The "good" status signal also indicates how many symbols were improperly stored. When there are more than T improperly stored symbols, the ECVG 348 outputs an "error" or "bad" status signal. The "error" status signal indicates that there are already too many errors for the ECVG 348 to correct. This shown in FIG. 5 as step 118 of method 102.

The status signals are then received by the control logic 312 of the DMA 314. In response, the control logic 312 generates a corresponding status signal for each of the code words $c'_{odd}(x)$ and $c'_{even}(x)$ that is provided to the CPU 202. If the control logic 312 receives a "good" status signal (i.e. there are T or less errors), then it will generate itself a "good" status signal indicating that writing of the original symbols representing the code words $c_{odd}(x)$ or $c_{even}(x)$ to the mass memory 306 was successful and that the host CPU 202 should not take any remedial action. If the control logic 312 receives an "error" status signal (i.e. there are more than T errors), then it will generate itself an "error" status signal indicating that writing of the original symbols representing the code words $c_{odd}(x)$ or $c_{even}(x)$ to the mass memory 306 was unsuccessful and that the host CPU 202 should take remedial action.

Referring to FIGS. 1 and 3, the status signals generated by the control logic 312 of the DMA 314 are then sent to the CPU 202. If the CPU 202 receives an "error" status signal (i.e. there are more than T errors), it will then take remedial actions by generating remedial action signals for the read/write controller 302 to process. These remedial condition signals may include (a) signals for attempting to store the data block at the same location, (b) signals for changing the storage control parameters for a second attempt at storing the data block at the same location, or (c) signals for storing the data block at a different location. However, if the CPU 202 receives a "good" status signal (i.e. there are no more than T errors), then the CPU 202 will take no remedial actions and will address the next storage or retrieval task for the read/write controller 302 to process. This is shown in FIG. 5 as step 120 in method 102.

The threshold number T is selected to be greater than one and less than the actual maximum number M of improperly stored symbols that the ECC can correct. The number T is greater than one because the decoder 318 rather than the routine 216 can provide corrections during a later retrieval request from the host computer system 200 if there are less than T improperly stored symbols. The number T is less than M because the mass memory medium 336 that stores the symbols of the code words $c'_{odd}(x)$ and $c'_{even}(x)$ may degrade over time. Thus, if each code word $c_{odd}(x)$ or $c_{even}(x)$ of the encoded data block is initially stored with no more than T symbol errors, but over time more than T but less than M+1 symbol errors occur, the symbol errors can still be corrected later by the error correcting routine 216 of the host computer system 200 when the data block is requested to be read from mass memory 306 by the host system 200.

In the preferred embodiment, the ECVG 348 is configured to detect up to 2 improperly stored symbols for each of the code words $c'_{odd}(x)$ and $c'_{even}(x)$ retrieved from mass memory 306 (i.e. T=2). Thus, for the two code words $c'_{odd}(x)$ and $c_{even}(x)$ combined, the ECVG 348 can detect up to a total of 4 improperly stored symbols. In this case, the status signal outputted by the ECVG 348 is a 2 bit signal with a "good " status signal being represented by the binary equivalents of the numerals 0–2 and an "error " status signal being represented by the binary equivalent of the numeral 3.

Furthermore, as indicated previously, the actual maximum number of symbols that can be corrected by one of the interleaved ECCs is 5 (i.e. M=5). Thus, the threshold number T for each of the code words $c'_{odd}(x)$ and $c'_{even}(x)$ can be in the range of 2–4 (i.e. the threshold number T should be greater than one and less than the maximum number of symbols that can be corrected using the full power of the ECC). Furthermore, for the two code words $c'_{odd}(x)$ and $c'_{even}(x)$ combined, the actual total number of symbols that can be corrected is 10.

Reading Data Block from Mass Memory Upon User Request

Referring back to FIG. 1, after a data block has been successfully stored in the mass memory 306 using the method 102 just described, the data block can then be retrieved at a later time. This data block may be retrieved in response to a user request generated with the user interface 206 or by a request generated by an application program running on the CPU 202. Referring to FIGS. 1 and 2, in either case, the CPU 202 calls up the data read routine 216 of the operating system 210. In response, the data read routine 216 then generates a data read signal that is sent to the mass memory storage system 300.

In response to the data read signal, the DMA 314 generates a data retrieve signal for directing retrieval of the data and error correction symbols of the code words $c'_{odd}(x)$ and $c'_{even}(x)$ that were earlier successfully written to mass memory 306. The mass memory control logic 334 receives this signal and controls retrieval of these data and error correction symbols from the mass memory medium 336.

The retrieved sequence of 8 bit symbols is directly provided to the RAM 308. Referring to FIG. 3, the control logic 312 of the DMA 314 then controls the RAM 308 so that it only stores the data symbols of the code words $c'_{odd}(x)$ and $c'_{even}(x)$ that were earlier stored in mass memory 306.

The retrieved sequence of 8 bit data and error correction symbols is also provided to the XOR circuit 340 of the decoder 320. Referring to FIG. 4A, the array of NAND gates 352 of the XOR circuit 340 receives a compare disable signal from the control circuit 316 during the read operation requested by the host CPU 202. This disable signal effectively disables the compare function of the array of XOR gates 354. As a result, the array of XOR gates 354 provides the 8 bit symbols representing the code words $c'_{odd}(x)$ and $c'_{even}(x)$ to the delay circuit 344 and to the array of inverters 358 in inverted form.

The delay buffer 344 includes the four arrays of flip flops 360-1 to 360-4. These arrays 360-1 to 360-4 each have 8 parallel flip flops. After passing through the arrays 360-1 to 360-4, the sequence of inverted 8 bit symbols representing the code words $c'_{odd}(x)$ and $c'_{even}(x)$ is sent directly to the MUX 374 of the MUX circuit 345.

As was indicated earlier, the array of inverters 358 also receives these inverted 8 bit symbols. After the inverter array 358 inverts these symbols, they are provided to the 8 bit to 9 bit symbol converter 342 which converts this sequence of 8 bit symbols into a sequence of 9 bit symbols.

The NAND gate array 378 receives the sequence of 9 bit symbols provided by the converter 342. When the NAND gate array 378 receives the shift enable signal, the linear feedback shift register circuit 372 together with the XOR gate array 370 protects against shifts of the sequence of symbols representing the code words $c'_{odd}(x)$ and $c'_{even}(x)$. However, when the NAND gate array 378 receives a shift disable signal, the XOR gate array 370 simply outputs the 9 bit symbols representing the code words $c'_{odd}(x)$ and $c'_{even}(x)$ in inverted form.

The MUX 374 receives a "1 " bit, the sequence of inverted 8 bit symbols representing the code words $c'_{odd}(x)$ and $c'_{even}(x)$ outputted by the delay buffer 344, and the sequence of inverted 9 bit symbols representing these same code words outputted by the XOR gate array 370. The MUX 374 is controlled by the control circuit 316 so that the "1" bit is appended to each 8 bit data symbol of the sequence of symbols received from the delay buffer 344. Thus, the MUX 374 outputs a sequence of inverted 9 bit data symbols. Furthermore, the MUX 374 is controlled by the control circuit 316 so that the inverted 9 bit error correction symbols received from the converter 342 are appended to the end of the stream of the inverted 9 bit data symbols outputted by the MUX 374. Thus, the MUX 374 generates a sequence of inverted 9 bit data and error correction symbols that represent the code words $c'_{odd}(x)$ and $c'_{even}(x)$.

The inverted 9 bit symbols provided by the MUX 374 are inverted by the array of 9 parallel inverters 376 prior to being received by the syndrome generator 346. Thus, the syndrome generator 346 receives the 9 bit symbols of the code words $c'_{odd}(x)$ and $c'_{even}(x)$ in non-inverted form.

The syndrome generator 346 receives these 9 bit data and error correction symbols and computes 11 error syndromes $S_{odd/i}$ for the interleaved code word $c'_{odd}(x)$ and 11 error syndromes $S_{even/i}$ for the interleaved code word $c'_{even}(x)$. In this case, where the host computer system 200 requests retrieval of the data block stored in the mass memory 306, the error syndromes are generated from the division of each of the code words $c'_{odd}(x)$ and $c'_{even}(x)$ with each of the 11 factors $g_i(x)$ of the generator polynomial g(x). The syndromes $S_{odd/i}$ and $S_{even/i}$ are provided to the ECVG 348.

As was indicated earlier for the write operation, the ECVG 348 will generate for each code word $c'_{odd}(x)$ and $c'_{even}(x)$ a corresponding status signal in response to receiving the syndromes $S_{odd/i}$ and $S_{even/i}$. As was also indicated earlier, if there are no more than T improperly stored symbols, the ECVG 348 outputs a "good " status signal which also indicates how many symbols were improperly stored in mass memory. But, if there are more than T improperly stored symbols, the ECVG 348 outputs an "error " status signal indicating that there are too many errors for the ECVG 348 to correct. Each of the status signals for the code words $c'_{odd}(x)$ and $c'_{even}(x)$ is sent to the control logic 312 of the DMA 314.

Furthermore, for each code word $c'_{odd}(x)$ and $c'_{even}(x)$, if there are no more than T improperly stored symbols, the ECVG 348 generates a 9 bit error location vector and an 8 bit error correction value for each corrupted (i.e. improperly stored) symbol. The error location vector identifies the location of the corrupted symbol in the sequence of data and error correction symbols representing the code words $c'_{odd}(x)$ and $c'_{even}(x)$. The error correction value includes the bits necessary for correcting the improperly stored symbol by XOR'ing it with the error correction value. The error locations and the corresponding correction values are respectively stored in the registers 322 and 323 of the DMA 314.

If the control logic 312 receives a "good" status signal, it retrieves the error locations from the register 322. In response, the control logic 312 retrieves sequentially from the RAM 308 the corrupted data symbols corresponding to the retrieved error locations and sends them to the XOR circuit 338. Since the error correction symbols of the code words $c'_{odd}(x)$ and $c'_{even}(x)$ were not stored in the RAM 308, the control logic 312 of the DMA 314 will therefore only retrieve these corrupted data symbols from the RAM 308. At the same time, the control logic 312 sequentially retrieves the correction values from the register 323 and provides them to the XOR circuit 338 as well. The XOR circuit 338 XOR's the bits of each of the corrupted 8 bit data symbols retrieved from RAM 308 with the bits of the corresponding error correction value retrieved from the register 323. The resulting corrected data symbols are sequentially stored back in the RAM 308 at their proper locations. Referring to FIG. 1, the data symbols stored in the RAM 308 are then sequentially retrieved by the control logic 312 of the DMA 314 and provided to the CPU bus 208.

However, if the control logic 312 receives an "error" status signal, it will not be able to retrieve error locations from the register 322, nor error correction values from the register 323, nor the corrupted symbols from the memory because there are too many errors for the ECVG 348 to detect and correct. Instead, the data symbols stored in the RAM 308, including the unidentified corrupted symbols, are sequentially retrieved by the control logic 312 of the DMA 314 and provided to the CPU bus 208.

Referring back to FIG. 3, as was discussed earlier for the write with verification operation, in response to the status signals provided by the ECVG 348, the control logic 312 also generates corresponding status signals for each of the code words $c'_{odd}(x)$ and $c'_{even}(x)$. Referring back to FIG. 3, when the control logic 312 receives an "error" status signal, it generates the "error" status signal described earlier. And, when the control logic it receives a "good" status signal, it generates the "good" status signal described earlier. These status signals are then outputted to and received by the CPU 202.

If a "good" status signal is received by the CPU 202 from the DMA 314, then it does not call up the error correction routine 216. There is no need for calling up this routine because there are no more than T corrupted data symbols and the ECVG 348 together with the DMA 314 have the capability to and will correct all of these corrupted data symbols. Since the CPU 202 is spared from performing the task of correcting the improperly stored symbols, it may perform other tasks instead. However, if the "error" status signal is received by the CPU 202, then it calls up the error correction routine 216. This routine is called up because there are more than T corrupted data symbols and the ECVG 348 together with the DMA 314 do not have the capability to correct all of these corrupted data symbols.

Thus, the CPU 202 is not spared from performing the task of correcting the improperly stored symbols.

But, the host CPU 202 can also receive the error syndromes $S_{odd/i}$ and $S_{even/i}$ computed by the syndrome generator 346. As a result, the error correction routine 216 need not separately compute the error syndromes $S_{odd/i}$ and $S_{even/i}$. Thus, the CPU 202 is spared from performing one of the tasks necessary for correcting the corrupted symbols.

EMBODIMENT UTILIZING ECC DECODER WITH ERROR MONITOR

Figure 6:
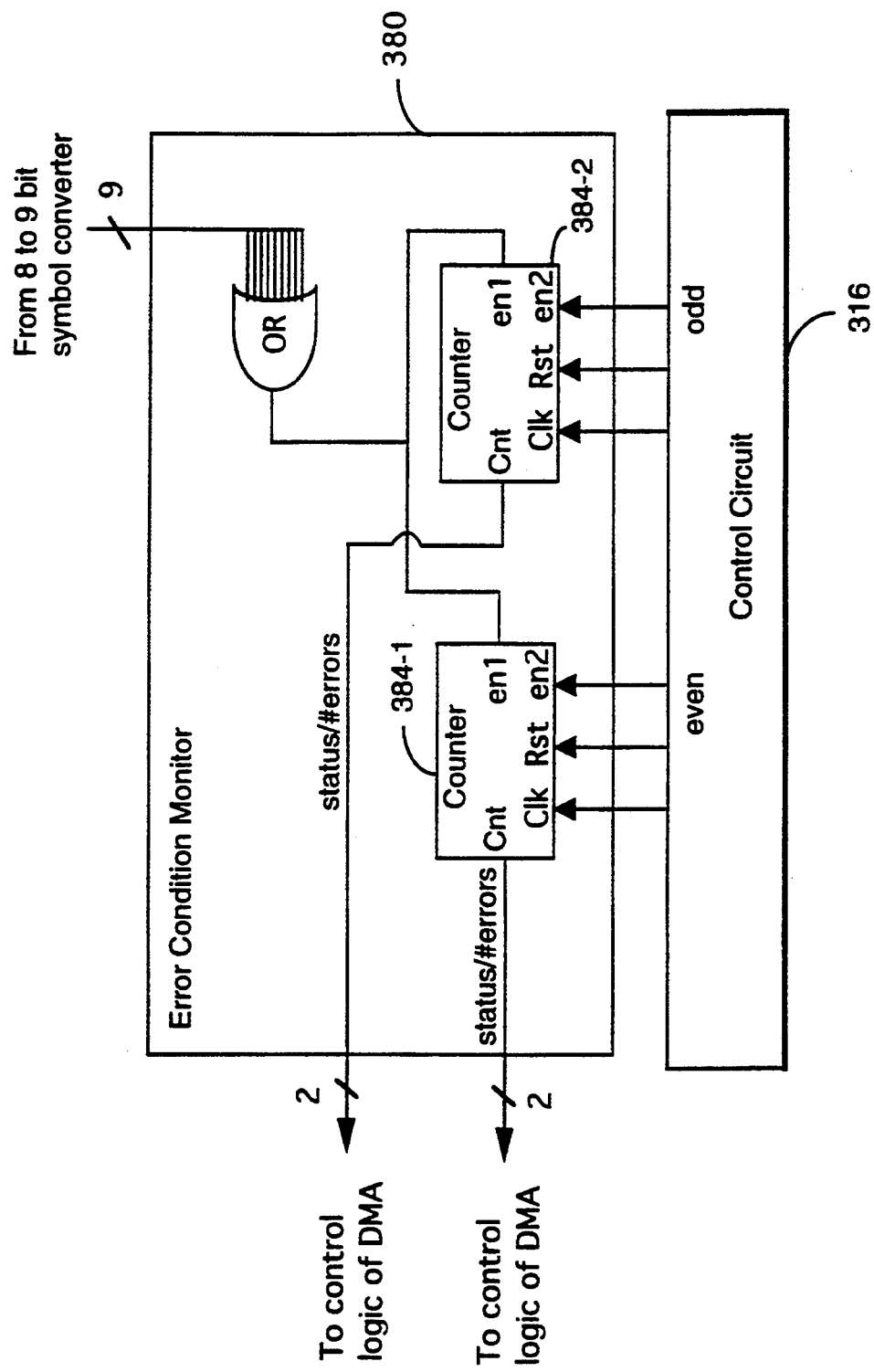
FIG. 6 provides an embodiment of an error condition monitor for use with the read/write controller of FIG. 3.
Figure 7:
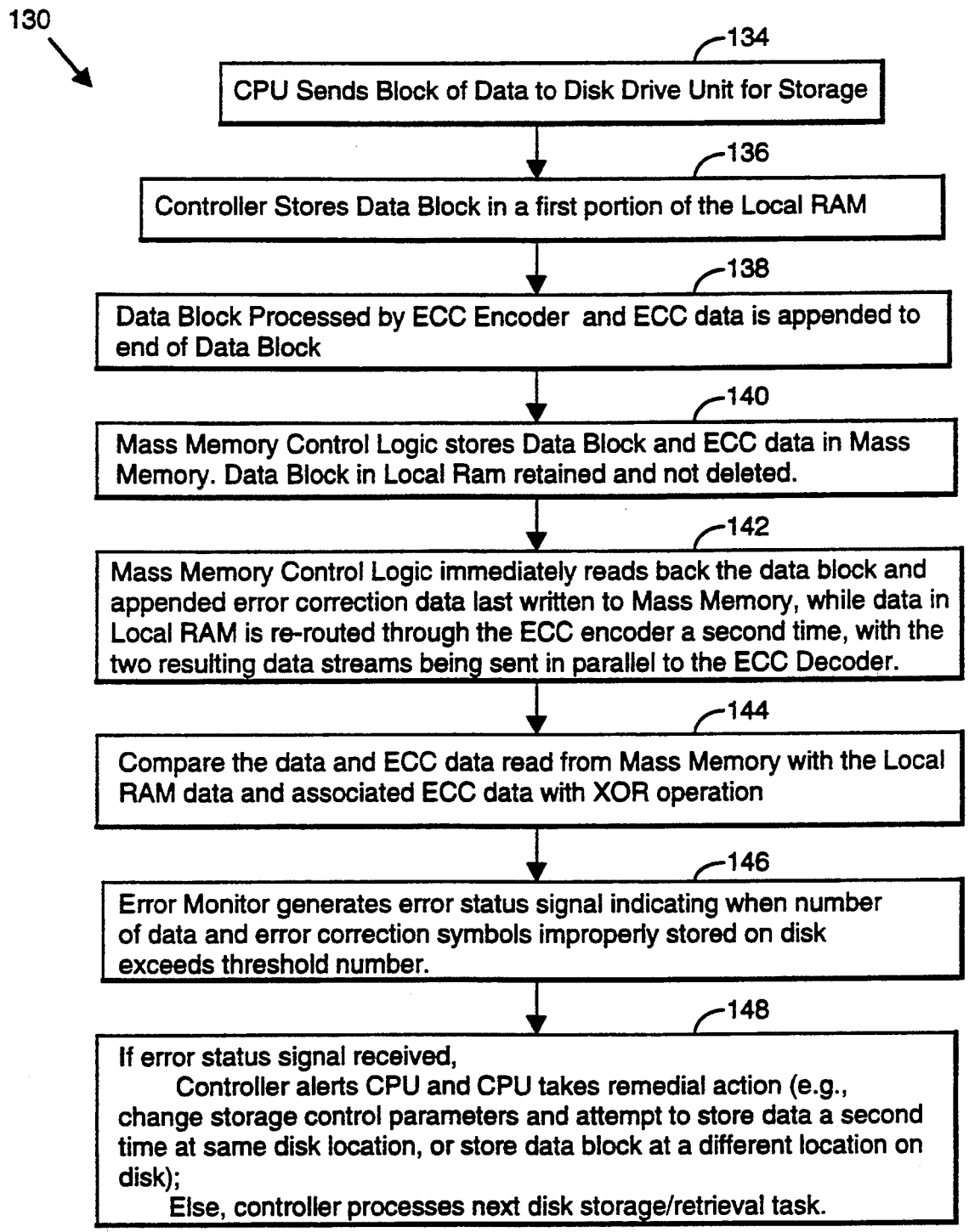
FIG. 7 provides a method associated with the read/write controller of FIG. 6.

FIG. 6 in conjunction with FIG. 3 provides an illustration of another embodiment of the invention. In this embodiment, the ECC circuit 310 employs the ECC encoder 318 and an ECC decoder 320 that includes an error monitor 380. FIG. 7 shows the method 130 associated with this embodiment.

Writing Data Block to Mass Memory

In this embodiment, the encoder 318 is configured in the same way as described earlier and as shown in FIG. 3. Thus, the steps 134–142 in method 130 shown in FIG. 7 are the same as the steps 104–112 in method 102 shown in FIG. 5.

Furthermore, the decoder 320 is configured in the same way as described earlier and as shown in FIG. 3, except that it now includes an error monitor 380. The error monitor 380 includes two parallel counter circuits 384-1 and 384-2.

As shown in FIG. 6, after the code words $c'_{odd}(x)$ and $c'_{even}(x)$ are retrieved from the mass memory 306 immediately after being stored there, the error monitor receives the sequence of symbols that represent the remainder words $R_{odd}(x)$ and $R_{even}(x)$. Thus, the step 144 of method 130 shown in FIG. 7 is the same as step 114 in method 102 shown in FIG. 5.

The counter circuit 384-1 counts the non-zero symbols in the sequence of symbols representing the remainder word $R_{odd}(x)$ and the counter circuit 384-2 counts the non-zero symbols in the sequence of symbols representing the remainder word $R_{even}(x)$. The non-zero symbols of the remainder words $R_{odd}(x)$ and $R_{even}(x)$ respectively represent the improperly stored data or error correction symbols of the code words $c'_{odd}(x)$ and $c'_{even}(x)$.

In this case, during the immediate read back of the write operation, each of the counter circuits 384-1 and 384-2 outputs a status signal rather than the ECVG 340. The status signal of the first counter circuit 384-1 is associated with the code word $c'_{odd}(x)$ and the status signal of the second counter circuit 384-2 is associated with the code word $c'_{even}(x)$.

Similar to the earlier described embodiment, if there are no more than T improperly stored symbols per code word, the counters 384-1 and 384-2 generate "good" status signals which also indicate how many symbols were improperly stored in the mass memory 306. If there are more than T improperly stored symbols per code word, the counters 384-1 and 384-2 generate "error" status signals indicating that there are too many errors for the ECVG 348 to correct for a later read operation requested by the CPU 202. This is shown in FIG. 7 as step 146 of method 130.

In the preferred embodiment where T=2, the counters 384-1 and 384-2 can be 2 bit counters that do not increment past a value of 3. Thus, as was the case in the earlier described embodiment, a "good" status signal will be represented by the values 0 to 2 while an "error " status signal will be represented by the value 3 (that indicates too many errors).

The DMA 314 receives the status signals provided by the counters 384-1 and 384-2 and in response generates the corresponding status signals described earlier. Referring to FIGS. 1 and 3, and as was the case in the earlier embodiment, these status signals are then sent to the CPU 202 which then takes the appropriate actions described earlier. Thus, the step 148 of method 130 shown in FIG. 7 is the same as step 120 in method 102 shown in FIG. 5.

Reading Data Block from Mass Memory Upon User Request

In this embodiment, the process of reading the data block back from the mass memory upon a user request is the same as in the earlier described embodiment. Thus, the same components described earlier are used in this process.

EMBODIMENT UTILIZING ECC ERROR MONITOR

Figure 8:
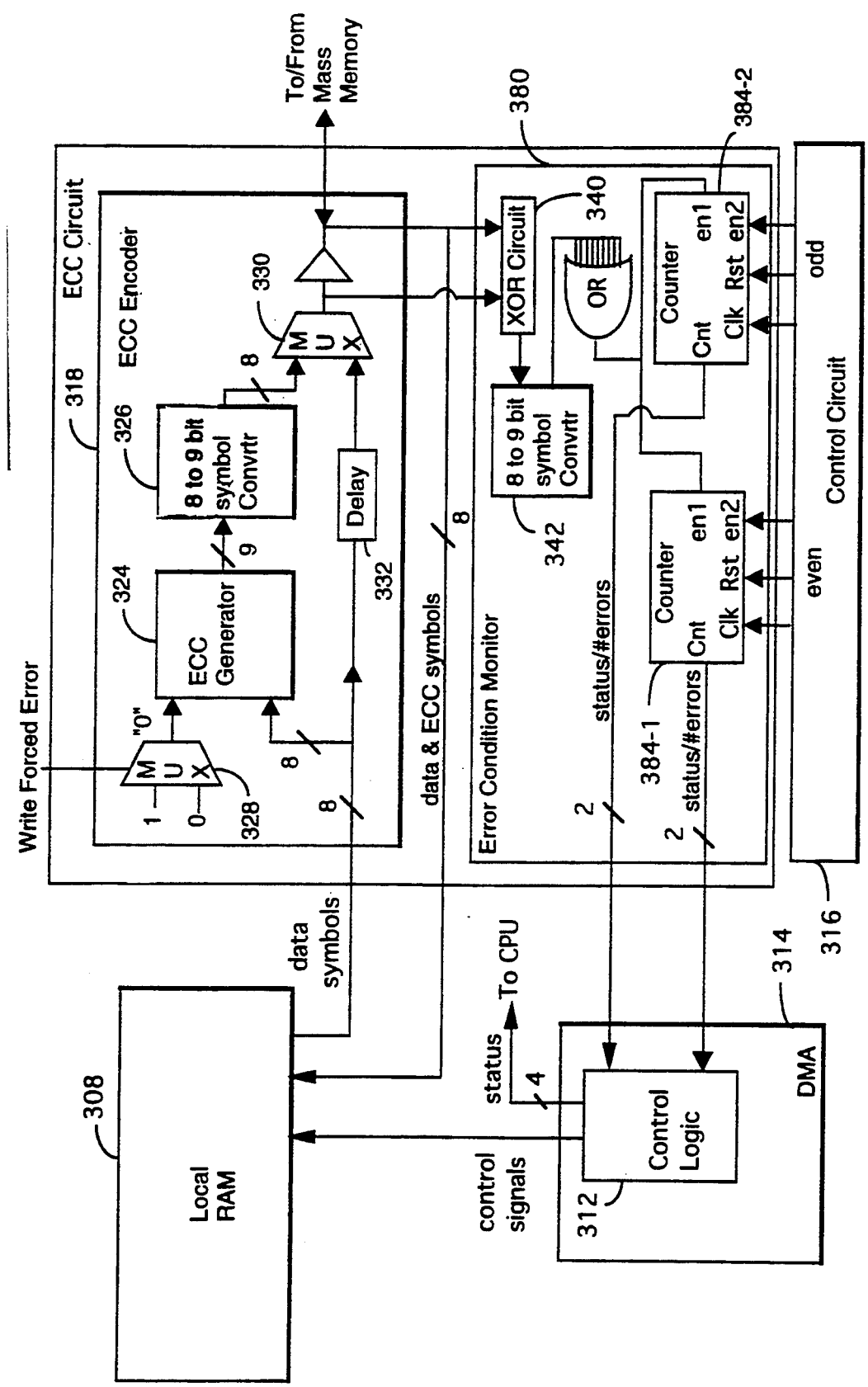
FIG. 8 provides still another embodiment of the read/write controller in accordance with the present invention.

FIG. 8 provides an illustration of another embodiment of the invention. In this embodiment, the ECC circuit 310 employs the ECC encoder 318 and the error monitor 380. The method 130 shown in FIG. 7 is also associated with this embodiment.

Writing Data Block to Mass Memory

In this embodiment, the encoder 318 is configured in the same way as described earlier and as shown in FIG. 3. The steps 134-142 in method 130 shown in FIG. 7 are used in the encoding process utilized by the encoder 318.

The monitor 380 in this embodiment also includes the XOR circuit 340 and the 8 bit to 9 bit symbol converter 342 as well as the parallel counter circuits 384-1 and 384-2. Otherwise, it is configured in the same way and performs the same functions as was described earlier with respect to the monitor 380 shown in FIG. 6. Thus, the steps 144 and 146 shown in FIG. 7 are also associated with the embodiment of FIG. 6.

The control logic 312 receives the status signals and generates the earlier described corresponding status signals. Thus, it performs the same operations as were described earlier for the configuration of FIG. 6. This is step 148 of the method shown in FIG. 7.

Reading Data Block from Mass Memory Upon User Request

In this embodiment, the data symbols of the code words $c'_{odd}(x)$ and $c'_{even}(x)$ are retrieved from the RAM 308 without any corrections taking place since the decoder 320 and specifically the ECVG 348 and the syndrome generator 346 are not included. As a result, the error correcting routine 216 must compute the error syndromes $S_{odd/i}$ and $S_{even/i}$, the error location vectors, and error correction values for the corrupted data and error correction symbols.

While the present invention has been described with reference to a few specific embodiments, the description is illustrative of the invention and is not to be construed as limiting the invention. For example, in other embodiments of the invention, the ECC encoder 318, the ECC decoder 320, and the error monitor 380 may operate on sequences of data segments having a different size than the 9 bit symbols of the preferred embodiment. Furthermore, various other modifications may occur to those skilled in the art without departing from the true spirit and scope of the invention as defined by the appended claims.

What is claimed is:

1. A read/write controller for a mass memory, said mass memory and said controller used in conjunction with a host processor, said controller comprising:
   a local memory that receives and stores a data block from said host processor, said data block comprising a sequence of data symbols of predetermined size;
   an encoder, coupled to said local memory, for encoding and re-encoding said stored data block with error correction data, said error correction data comprising a sequence of error correction symbols of predetermined size, said encoded data block comprising said data symbols and said error correction symbols;
   mass memory control means, coupled to said encoder, for controlling storage of said data and error correction symbols of said encoded data block in said mass memory and for controlling retrieval of said stored data and error correction symbols from said mass memory;
   a comparator coupled to said encoder and to said mass memory control means to compare each of data and error correction symbols retrieved from said mass memory with corresponding re-encoded ones of data and error correction symbols received from said encoder; and
   a decoder coupled to said comparator to decode the stream of symbols output therefrom, said decoder generating an error status signal when by decoding the stream of symbols from said comparator it determines that more than a predetermined threshold number of said retrieved data and error correction symbols are improperly stored in said mass memory.

2. The read/write controller of claim 1 further comprising local memory control means for controlling storage of said data block in said local memory and controlling retrieval of said data block from said local memory, said local memory control means also for receiving said error status signal and transmitting in response a second error status signal to said host processor so as to prompt said host processor to undertake remedial action.

3. The read/write controller of claim 1 wherein:
   said error correction data provides information sufficient to correct a predefined maximum number of data and error correction symbols in said encoded data block; and
   said threshold number is greater than one and less than said predefined maximum number of data and error correction symbols.

4. The read/write controller of claim 1 wherein said encoder is a Reed-Solomon error correcting code encoder and said decoder is a Reed-Solomon error correcting code decoder.

5. The read/write controller of claim 4 wherein said comparator generates in response to each comparison an error flagging symbol of predetermined size, and wherein said decoder includes:
   a syndrome generator that receives said error flagging symbols and computes in response Reed-Solomon error syndromes; and an error correction vector generator that receives said error syndromes and generates in response said error status signal.

6. The read/write controller of claim 1 wherein said decoder includes an error monitor that generates said error status signal.

7. The read/write controller of claim 6 wherein said comparator generates in response to each comparison an error flagging symbol of predetermined size, and wherein said error monitor includes counting means for counting non-zero error flagging symbols generated by said comparator and for generating said error status signal when said count exceeds said threshold number.

8. The read/write controller of claim 1 wherein:
said mass memory control means is also for retrieving said stored data and error correction symbols from said mass memory when requested by said host processor; and
said decoder includes means for correcting ones of said requested retrieved data and error correction symbols that are improperly stored in said mass memory.

9. The read/write controller of claim 8 wherein said decoder corrects improperly stored ones of said requested retrieved data and error correction symbols when no more than said threshold number of said requested retrieved data and error correction symbols are improperly stored in said mass memory.

10. A read/write controller for a mass memory, said mass memory and said controller used in conjunction with a host processor, said controller comprising:
a local memory that receives and stores a data block from said host processor, said data block comprising a sequence of data symbols of predetermined size;
an encoder for encoding and re-encoding said stored data block with error correction data, said error correction data comprising a sequence of error correction symbols of predetermined size, said encoded data block comprising said data symbols and said error correction symbols;
control means for controlling storage of said data and error correction symbols of said encoded data block in said mass memory and for controlling retrieval of said stored data and error correction symbols from said mass memory;
a comparator coupled to said encoder and to said control means to compare each of data and error correction symbols retrieved from said mass memory with corresponding re-encoded ones of data and error correction symbols received from said encoder; and
an error monitor coupled to said comparator to count the number of times the output thereof is non-zero, said monitor generating an error status signal when by counting the number of non-zero outputs of said comparator it determines that more than a predetermined threshold number of said retrieved data and error correction symbols are improperly stored in said mass memory.

11. The read/out write controller of claim 10 further comprising local memory control means for controlling storage of said data block in said local memory and controlling retrieval of said data block from said local memory, said local memory control means also for receiving said error status signal and transmitting a second error status signal to said host processor so that said host processor undertakes remedial action.

12. The read/write controller of claim 10 wherein said comparator generates in response to each comparison an error flagging symbol of predetermined size, and wherein said error monitor includes:
means for counting at least up to said threshold number the total number of non-zero error flagging symbols generated by said comparator and for generating said error status signal when said total exceeds said threshold number.

13. The read/write controller of claim 10 wherein:
said error correction data provides information sufficient to correct a predefined maximum number of data and error correction symbols in said encoded data block; and
said threshold number is greater than one and less than said predefined maximum number of data and error correction symbols.

14. A method performed by a mass memory controller for verifying the integrity of a data block written to a mass memory, said mass memo used in conjunction with a host processor, said method performed by said mass memory controller comprising the steps of:
receiving and storing said data block in a local memory, said data block comprising a sequence of data symbols of predetermined size;
encoding said stored data block with error correction data, said error correction data comprising a sequence of error correction symbols of predetermined size, said encoded data block comprising said data symbols and said error correction symbols;
storing said data and error correction symbols of said encoded data block in said mass memory;
retrieving said stored data and error correction symbols from said mass memory;
encoding said stored data block again;
comparing the symbols in the encoded data block resulting from said second encoding step to the symbols in the encoded data block retrieved from said mass memory to determine how many of the corresponding symbols therein do not match; and
generating a first error status signal when more than a predetermined threshold number of symbol mismatches has been determined in said comparing step.

15. The method of claim 14 further comprising the step of transmitting a second error status signal in response to said first error status signal.

16. The method of claim 14 wherein:
said error correction data provides information sufficient to correct a predefined maximum number of data and error correction symbols in said encoded data block; and
said threshold number is greater than one and less than said predefined maximum number of data and error correction symbols.

17. The method of claim 14 wherein said encoding steps encode said data block with a Reed-Solomon error correcting code.

18. The method of claim 17 wherein said step of generating said first error status signal includes the steps of:
generating an error flagging symbol of predetermined size in response to each comparison performed in said comparing step; and
generating Reed-Solomon error syndromes in response to said generated error flagging symbols;
and wherein said first error status signal is generated in response to said generated error syndromes, 19. The method of claim 14 wherein said step of generating said first error status signal includes the steps of:

generating an error flagging symbol of predetermined size in response to each comparison performed in said comparing step;

counting up to said threshold number the total of non-zero error flagging symbols generated; and generating said first error status signal when said total exceeds said threshold number, 20. The method of claim 14 further comprising the steps of:

retrieving said stored data and error correction symbols from said mass memory when requested by said host computer; and correcting ones of said requested retrieved data and error correction symbols that do not match corresponding symbols in the encoded data block resulting from said second encoding step only when no more than said threshold number of symbol mismatches is determined in said comparing.

* * * * *